(12) United States Patent
Baek

(10) Patent No.: US 12,017,647 B2
(45) Date of Patent: Jun. 25, 2024

(54) ADVANCED DRIVER ASSISTANCE SYSTEM AND VEHICLE HAVING THE SAME

(71) Applicant: MANDO MOBILITY SOLUTIONS CORPORATION, Pyeongtaek-si (KR)

(72) Inventor: Hyunwoo Baek, Seongnam-si (KR)

(73) Assignee: HL KLEMOVE CORP., Incheon (KR)

(*) Notice: Subject to any disclaimer, the term of this patent is extended or adjusted under 35 U.S.C. 154(b) by 281 days.

(21) Appl. No.: 17/686,578

(22) Filed: Mar. 4, 2022

(65) Prior Publication Data

US 2022/0289176 A1 Sep. 15, 2022

(30) Foreign Application Priority Data

Mar. 11, 2021 (KR) .................. 10-2021-0031940

(51) Int. Cl.
*B60W 10/18* (2012.01)
*B60W 30/09* (2012.01)
*B60W 40/08* (2012.01)
*B60W 50/16* (2020.01)
*B60W 50/14* (2020.01)

(52) U.S. Cl.
CPC ............ *B60W 30/09* (2013.01); *B60W 10/18* (2013.01); *B60W 40/08* (2013.01); *B60W 50/16* (2013.01); *B60W 2050/146* (2013.01); *B60W 2540/049* (2020.02); *B60W 2554/80* (2020.02)

(58) Field of Classification Search
CPC .. B60W 2520/10; B60W 50/14; B60W 50/16; B60W 30/09; B60W 10/18; B60W 40/08; B60W 2540/049; B60W 2554/80; B60W 2050/146
See application file for complete search history.

(56) References Cited

U.S. PATENT DOCUMENTS

| | | | |
|---|---|---|---|
| 9,487,139 B1* | 11/2016 | Ishida ................... | B60W 30/08 |
| 10,031,521 B1* | 7/2018 | Newman ............. | B60H 1/00771 |
| 10,124,798 B2* | 11/2018 | Hall ........................ | G05D 1/027 |
| 11,092,963 B2* | 8/2021 | Wei ....................... | G05D 1/0088 |
| 2022/0266840 A1* | 8/2022 | Kim ........................ | G06V 20/58 |

FOREIGN PATENT DOCUMENTS

| | | |
|---|---|---|
| KR | 10-0221970 B1 | 9/1999 |
| KR | 10-0793869 B1 | 1/2008 |
| KR | 10-2041779 B1 | 11/2019 |

\* cited by examiner

*Primary Examiner* — Gonzalo Laguarda
(74) *Attorney, Agent, or Firm* — Harvest IP Law, LLP

(57) ABSTRACT

Disclosed herein a vehicle includes a display; a sound device; a vibrator; an occupant detector configured to detect an occupant to output occupant information; an obstacle detector configured to detect an obstacle to output obstacle information; a braking system that generates a braking force; and a controller configured to set braking distance information based on the occupant information, control operation of at least one of the display, the sound device, and the vibrator based on the set braking distance information and the obstacle information, and control the braking system in response to operation control information of the at least one of the display, the sound device and the vibrator.

18 Claims, 7 Drawing Sheets

ADVANCED DRIVER ASSISTANCE SYSTEM AND VEHICLE HAVING THE SAME

CROSS-REFERENCE TO RELATED APPLICATION(S)

This application is based on and claims priority under 35 U.S.C. § 119 to Korean Patent Application No. 10-2021-0031940, filed on Mar. 11, 2021 in the Korean Intellectual Property Office, the disclosure of which is incorporated herein by reference in its entirety.

TECHNICAL FIELD

The disclosure relates to an advanced driver assistance system for preventing collision with an obstacle and a vehicle having the same.

BACKGROUND

Recently, advanced driver assistance system (ADAS) has been developed variously to deliver driving information of a vehicle to a driver in order to prevent accidents caused by driver negligence, and to facilitate autonomous driving for the driver's convenience.

As an example, technologies that detects an obstacle around a vehicle by mounting a distance sensor on the vehicle to alert the driver are known.

As another example, technologies that obtains a distance with other vehicles through an electromagnet mounted on a bumper of a vehicle, determines that a collision situation is occurred if the obtained distance with the other vehicles falls within a certain distance, and supplies power to the electromagnet to generate magnetic force is known. And, this technologies allows the vehicle to automatically brake in the event of the collision situation.

Despite the fact that ADAS is provided in a vehicle for safety and convenience of a driver, a location and time that the driver pays attention also needs to be changed depending on surrounding environments, such as a width of a road, an amount of traffic, the number of bicycles or pedestrians, and changes in driving environments, such as a weight or driving speed of the vehicle. In other words, ADAS technologies also need to change depending on the surrounding situations and driving environments.

SUMMARY

An aspect of the disclosure is to provide an advanced driver assistance system capable of controlling an output of collision risk information for a collision with an obstacle based on distance information with the obstacle and driving speed information and performing an avoidance control for avoiding the obstacle, and a vehicle having the same.

Additional aspects of the disclosure will be set forth in part in the description which follows and, in part, will be obvious from the description, or may be learned by practice of the disclosure.

In accordance with an aspect of the disclosure, a vehicle includes a display; a sound device; a vibrator; an occupant detector configured to detect an occupant to output occupant information; an obstacle detector configured to detect an obstacle to output obstacle information; a braking system that generates a braking force; and a controller configured to set braking distance information based on the occupant information, control operation of at least one of the display, the sound device, and the vibrator based on the set braking distance information and the obstacle information, and control the braking system in response to operation control information of the at least one of the display, the sound device and the vibrator.

The braking system may perform a prefill, a pre-braking, and an emergency braking.

The controller may control the operation of the sound device when performing control for the prefill, and control the operation of the sound device, the display, and the vibrator when performing control for the pre-braking and the emergency braking, wherein a volume of sound output from the sound device while controlling the emergency braking is greater than that of sound output from the sound device while controlling the pre-braking; and an intensity of vibration generated by the vibrator while controlling the emergency braking is greater than that of vibration generated by the vibrator while controlling the pre-braking.

The vehicle may further include a storage for storing a braking distance corresponding to the number of occupants, wherein when setting the braking distance based on the occupant information, the controller is configured to set the braking distance to a predetermined braking distance in response to determining that the number of occupants is a predetermined number based on the occupant information, set the braking distance corresponding to the number of occupants based on information stored in the storage in response to determining that the number of occupants exceeds the predetermined number, and the set braking distance is longer than the predetermined braking distance.

The predetermined braking distance may include a first braking distance for controlling the prefill, a second braking distance for controlling the pre-braking, and a third braking distance for controlling the emergency braking.

The controller may obtain relative distance information with the obstacle based on the obstacle information, and control the prefill, the pre-braking, and the emergency braking based on the obtained relative distance information with the obstacle and the first, second and third braking distances.

The controller may determine a warning time of a first stage in response to a control time of the prefill, determine a warning time of a second stage in response to a control time of the pre-braking, and determine a warning time of a third stage in response to a control time of the emergency braking.

The occupant detector may be provided on a plurality of seat belts, respectively, and detects attachment/detachment of each belt to output attachment/detachment information.

The occupant detector may be provided on a plurality of seats, respectively, and detects a weight applied to each seat to output weight information detected.

In accordance with another aspect of the disclosure, a vehicle includes an occupant detector configured to detect an occupant to output occupant information; an obstacle detector configured to detect an obstacle to output obstacle information; a braking system that performs a prefill, a pre-braking and an emergency braking; a storage configured to store information on a first braking distance for controlling the prefill, a second braking distance for controlling the pre-braking, and a third braking distance for controlling the emergency braking, and store information on an increasing distance of the first braking distance, an increasing distance of the second braking distance, and an increasing distance of the third braking distance, per the number of occupants; and a controller configured to control the braking system based on the information on the first, second and third braking distances and the obstacle information in response to determining that the number of occupants is a predetermined number based on the occupant information, and identify the information on the increasing distances of the first, second and third braking distances corresponding to the number of occupants in response to determining that the number of occupants exceeds the predetermined number and control the braking system based on the information on the increasing distances of the first, second and third braking distances and the obstacle information.

The controller may determine a warning time of a first stage in response to a control time of the prefill, determine a warning time of a second stage in response to a control time of the pre-braking, and determine a warning time of a third stage in response to a control time of the emergency braking.

The vehicle may further include a display, a sound device, and a vibrator, wherein the controller is configured to control operation of the sound device in response to determining that it is the warning time of the first stage, and control operation of the sound device, the display, and the vibrator in response to determining that it is the warning time of the second and third stages.

A volume of sound output from the sound device when controlling the emergency braking, by the controller, may be greater than that of sound output from the sound device when controlling the pre-braking, and an intensity of vibration generated by the vibrator when controlling the emergency braking, by the controller, may be greater than that of vibration generated by the vibrator when controlling the pre-braking.

In accordance with another aspect of the disclosure, an advanced driver assistance system includes a camera for obtaining an image of a road and an image of an occupant; and a controller including a processor for processing the image of the road obtained by the camera, wherein the controller is configured to obtain occupant information from the image obtained by the camera, control a prefill, a pre-braking, and an emergency braking based on predetermined first, second, and third braking distance information in response to determining that the number of occupants is a predetermined number based on the obtained occupant information, and control the prefill, the pre-braking and the emergency braking based on information on an increasing distance of the first, second, and third braking distances corresponding to the number of occupants in response to determining that the number of occupants exceeds the predetermined number.

The controller may determine a warning time of a first stage in response to a control time of the prefill, determine a warning time of a second stage in response to a control time of the pre-braking, and determine a warning time of a third stage in response to a control time of the emergency braking.

The advanced driver assistance system may further include a display, a sound device, and a vibrator, wherein the controller is configured to control operation of the sound device in response to determining of the warning time of the first stage, and control the operation of the sound device, the display, and the vibrator in response to determining that the warning time of the second and third stages.

The advanced driver assistance system may further include an obstacle detector configured to detect an obstacle to output obstacle information; wherein the controller is configured to identify the obstacle information from the image of the road, determine a collision possibility based on the obstacle information detected by the obstacle detector and the identified obstacle information, and control the prefill, the pre-braking, and the emergency braking in response to determining that the collision possibility exists.

The controller may determine whether a driver keeps looking forward while driving based on the image obtained by the camera, and in response to determining that the driver does not keep looking forward while driving, detect the obstacle information through the obstacle detector in order to control the prefill, the pre-braking and the emergency braking.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
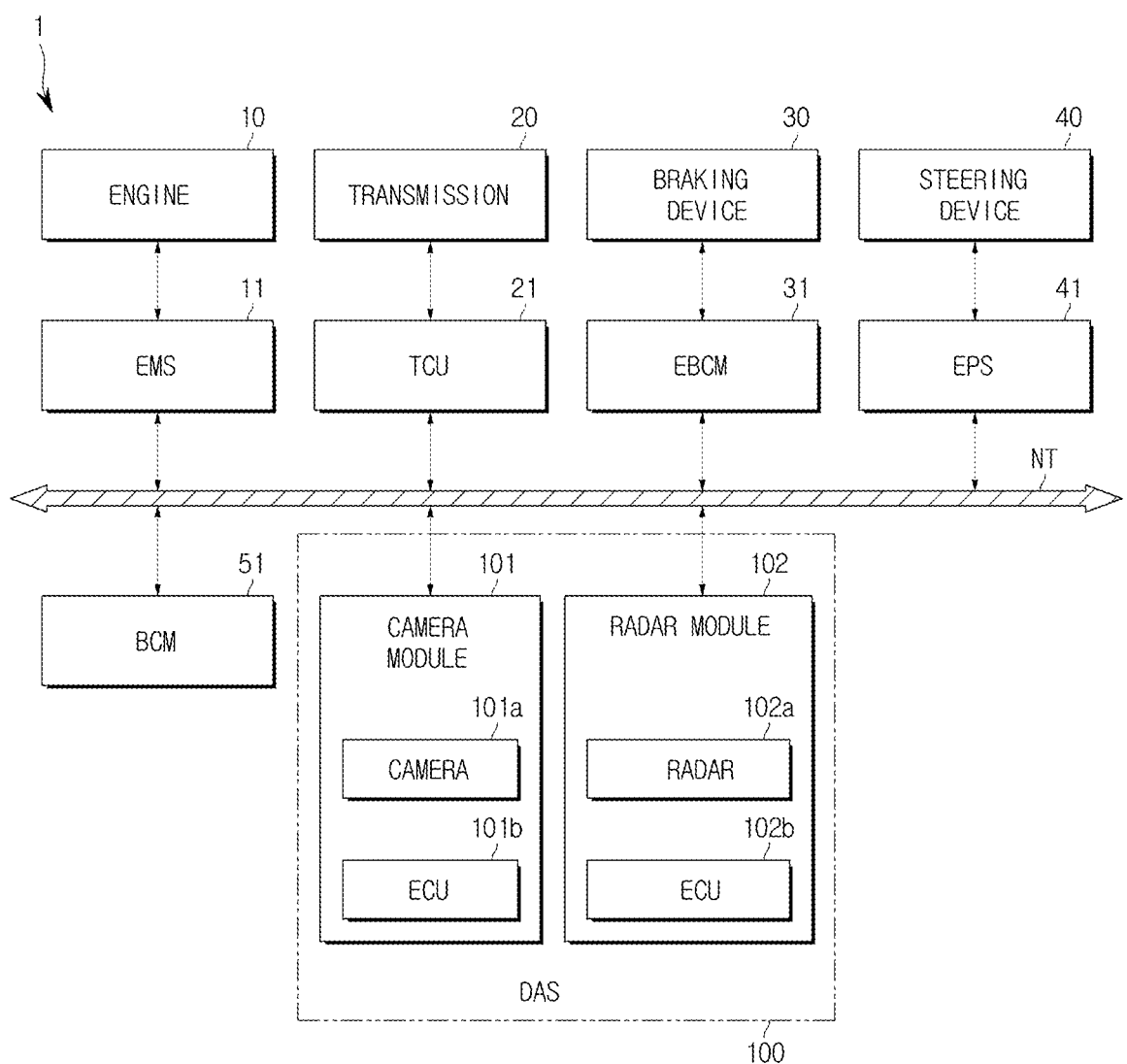
FIG. 1 is a view illustrating a configuration of a vehicle according to an embodiment of the disclosure.

Like numerals refer to like elements throughout the specification. Not all elements of embodiments of the disclosure will be described, and description of what are commonly known in the art or what overlap each other in the embodiments will be omitted.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that a member is "on" another member, the member may be directly on the other member or a third member may be disposed therebetween.

Terms such as "~ unit", "~ group", "~ block", "~ member", and "~ module" used in the specification may be implemented in software or hardware. Terms such as "~ unit", "~ group", "~ block", "~ member", and "~ module" may refer to a unit that processes at least one function or operation. In addition, terms such as "~ unit", "~ group", "~ block", "~ member", and "~ module" are used in at least one piece of hardware such as a field-programmable gate array (FPGA)/application specific integrated circuit (ASIC), or at least one software or processor stored in a memory.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, operating principles and embodiments of the disclosure will be described with reference to the accompanying drawings.

FIG. 1 is a view illustrating a configuration of a vehicle according to an embodiment of the disclosure.

A vehicle according to an embodiment of the disclosure may be a vehicle that performs a manual driving mode in which the vehicle is driven in response to a driver's driving intention and an autonomous driving mode in which the vehicle autonomously drives to a destination.

Referring to FIG. 1, a vehicle 1 includes an engine 10, a transmission 20, a braking device 30, and a steering device 40.

The engine 10 includes a cylinder and a piston, and may generate power for driving the vehicle 1.

The transmission 20 includes a plurality of gears, and may transmit power generated by the engine 10 to wheels of the vehicle.

The braking device 30 may decelerate the vehicle 1 or stop the vehicle 1 through friction with the wheels.

The steering device 40 may change a driving direction of the vehicle 1.

The vehicle 1 may include a plurality of electrical components.

For example, the vehicle 1 includes Engine Management System (EMS) 11, Transmission Control Unit (TCU) 21, Electronic Brake Control Module (EBCM) 31, Electronic Power Steering (EPS) 41, Body Control Module (BCM) 51, and Advanced Driver Assistance System (ADAS) 100.

The EMS 11 may control the engine 10 in response to a driver's intention to accelerate through an accelerator pedal or a request from an advanced driver assistance system (ADAS) 100. For example, the EMS 11 may control a torque of the engine 10.

The TCU 21 may control the transmission 20 in response to a driver's shift command through a shift lever and/or a driving speed of the vehicle 1. For example, the TCU 21 may adjust a shift ratio from the engine 10 to the wheels.

The EBCM 31 may control the braking device 30 in response to the driver's intention to brake through a brake pedal and/or a slip of the wheels. For example, the EBCM 31 may temporarily release braking of the wheels in response to the slip of the wheels detected when the vehicle 1 is braked (e.g., Anti-lock Braking Systems (ABS)).

The EBCM 31 may selectively release the braking of the wheels in response to oversteering and/or understeering detected when the vehicle 1 is steered (e.g., Electronic stability control (ESC)).

Furthermore, the EBCM 31 may temporarily brake the wheels in response to the slip of the wheel detected when the vehicle 1 is driven (e.g., Traction Control System (TCS)).

The EPS 41 may assist operation of the steering device 40 so that a driver may easily operate a steering wheel in response to the driver's intention to steer through the steering wheel. For example, the EPS 41 may assist the operation of the steering device 40 to decrease the steering force for a low-speed driving or parking and increase the steering force for a high-speed driving.

The BCM 51 may control operation of electrical components that provide convenience to a driver or ensure safety of the driver. For example, the BCM 51 may control a head lamp, a wiper, a cluster, a multi-function switch, and a direction indicator lamp, and the like.

The ADAS 100 may assist the driver to operate (a driving, a braking, and a steering) the vehicle 1. For example, the ADAS 100 may detect an environment around the vehicle 1 (e.g., other vehicles, pedestrians, cyclists, lanes, road signs, etc.), and control driving and/or braking and/or steering in response to the detected environment to the vehicle 1.

The ADAS 100 may provide a variety of functions to the driver. For example, the ADAS 100 may provide Lane Departure Warning (LDW), Lane Keeping Assist (LKA), High Beam Assist (HBA), Autonomous Emergency Braking (AEB), Traffic Sign Recognition (TSR), Smart Cruise Control (SCC), and Blind Spot Detection (BSD).

The ADAS 100 may include a collision avoidance device that outputs notification information on a collision with an obstacle or avoids the obstacle in order to prevent the collision with the obstacle.

The ADAS 100 may include an autonomous driving control device that automatically drives to a destination by recognizing road environments of the vehicle itself, determining the obstacles and driving conditions, and controlling the driving of the vehicle according to an expected driving route while avoiding obstacles.

The ADAS 100 includes a camera module 101 that obtains image data around the vehicle 1, and a radar module 102 that obtains obstacle data around the vehicle 1.

The camera module 101 includes a camera 101a and an Electronic Control Unit (ECU) 101b, and may photograph a front of the vehicle 1 and recognize other vehicles, pedestrians, cyclists, lanes, road signs, and the like.

The radar module 102 includes a radar 102a and an ECU 102b, and may obtain a relative position and/or a relative speed of obstacles (e.g., other vehicles, pedestrians, cyclists, etc.) around the vehicle 1.

The above electrical components may communicate with each other via a vehicle communication network (NT). For example, the electrical components may exchange data through Ethernet, Media Oriented Systems Transport (MOST), Flexray, Controller Area Network (CAN), and Local Interconnect Network (LIN).

The ADAS 100 may transmit a driving control signal, a braking control signal and a steering control signal to the EMS 11, the EBCM 31, and the EPS 41 through the NT, respectively.

Figure 2:
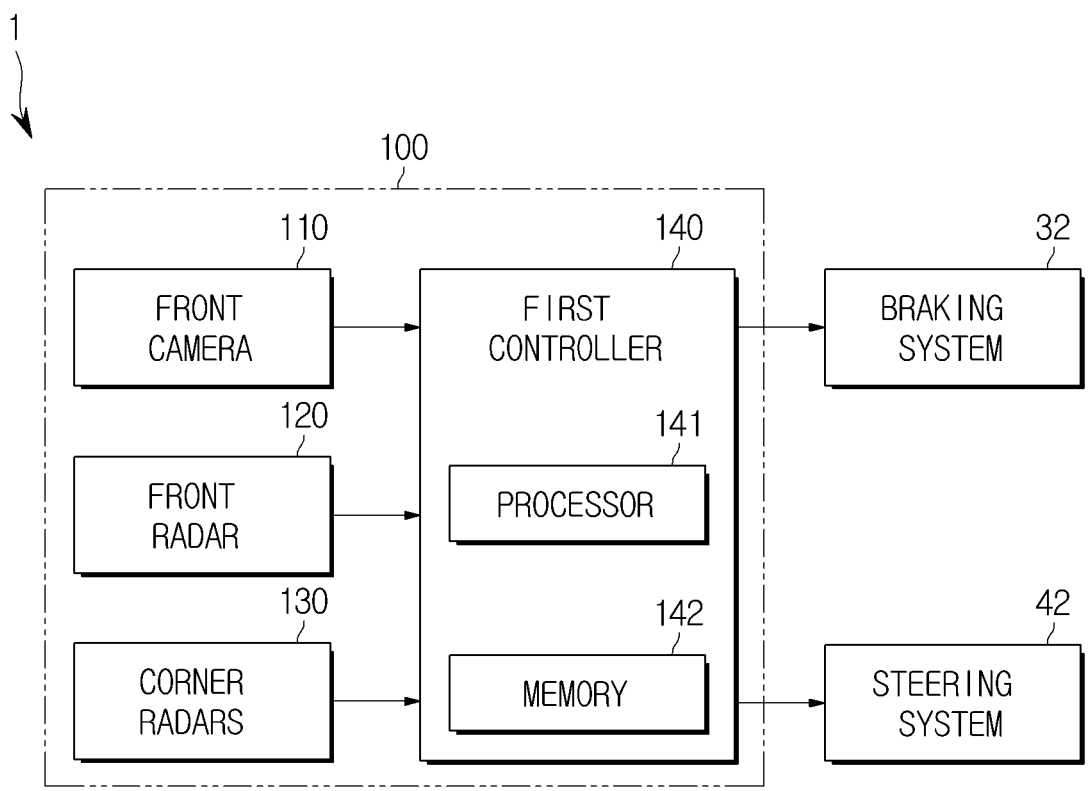
FIG. 2 is a view illustrating a configuration of an advanced driver assistance system provided in a vehicle according to an embodiment of the disclosure.
Figure 3:
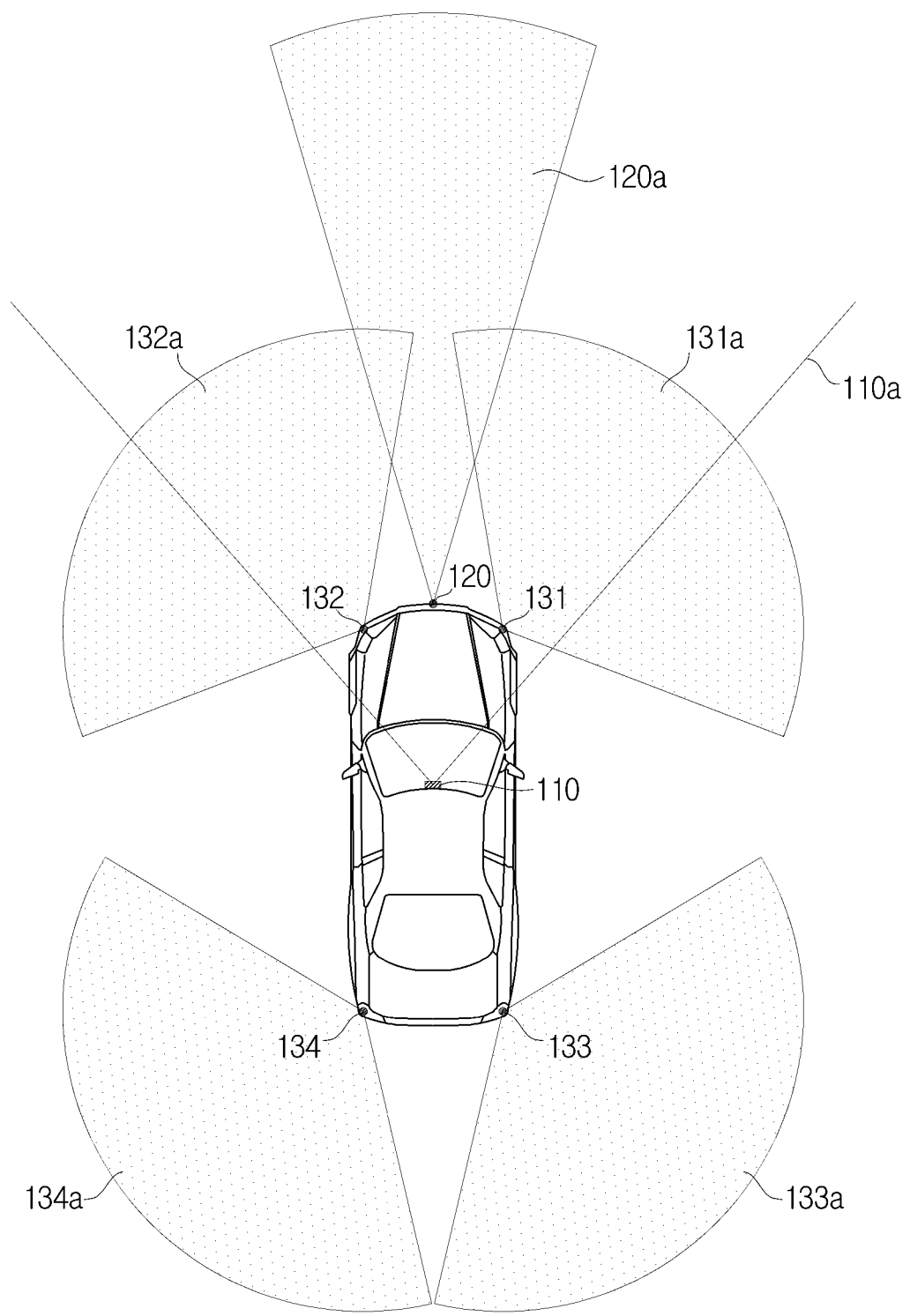
FIG. 3 is a view illustrating a detection area of a camera and a radar included in an advanced driver assistance system of a vehicle according to an embodiment of the disclosure.

FIG. 2 is a view illustrating a configuration of the ADAS provided in a vehicle according to an embodiment, and FIG. 3 is a view illustrating a detection area of a camera and a radar included in the ADAS of a vehicle according to an embodiment of the disclosure.

The ADAS of an embodiment of the disclosure may perform a collision avoidance function for avoiding a collision with an obstacle when changing a lane. In other words, the ADAS of the embodiment of the disclosure may be a collision avoidance device.

Referring to FIG. 2, the vehicle 1 may include a braking system 32, a steering system 42, and the ADAS 100.

The braking system 32 may include the EBCM 31 (see FIG. 1) and the braking device 30 (see FIG. 1) described in conjunction with FIG. 1, and the steering system 42 may include the EPS 41 (see FIG. 1) and the steering device 40 (se FIG. 1).

The ADAS 100 of the embodiment of the disclosure may include a front camera 110 as a camera of the camera module 101, and a front radar 120 and a plurality of corner radars 131, 132, 133 and 134 (130) as a radar of the radar module 102.

Referring to FIG. 3, the ADAS 100 may include the front camera 110 for securing a field of view 110*a* facing the front of the vehicle 1, the front radar 120, and the plurality of corner radars 130.

The front camera 110 may be installed on a front windshield of the vehicle 1.

The front camera 110 may photograph in front of the vehicle 1 and obtain image data in front of the vehicle 1. The image data in front of the vehicle 1 may include location information on at least one of other vehicles, pedestrians, cyclists, lanes, curbs, guard rails, street trees, and street lights positioned in front of the vehicle 1.

The front camera 110 may include a plurality of lenses and an image sensor. The image sensor may include a plurality of photodiodes that convert light into an electrical signal, and the plurality of photodiodes may be arranged in a two-dimensional matrix.

The front camera 110 may be electrically connected to the first controller 140. For example, the front camera 110 may be connected to the first controller 140 via the NT, connected to the first controller 140 via a hard wire, or connected to the first controller 140 via a printed circuit board (PCB).

The front camera 110 may transmit the image data in front of the vehicle 1 to the first controller 140.

The front radar 120 may have a field of sensing 120*a* facing in front of the vehicle 1. The front radar 120 may be installed, for example, on a grille or a bumper of the vehicle 1.

The front radar 120 may include a transmission antenna (or a transmission antenna array) that radiates a transmission wave toward in front of the vehicle 1, and a reception antenna (or a reception antenna array) that receives the reflected wave reflected by an obstacle.

The front radar 120 may obtain front radar data from the transmitted wave transmitted by the transmission antenna and the reflected wave received by the reception antenna.

The front radar data may include position information and a speed information regarding other vehicles or pedestrians or cyclists positioned in front of the vehicle 1.

The front radar 120 may calculate a relative distance to the obstacle based on phase difference (or time difference) between the transmitted radio wave and the reflected wave, and calculate a relative speed of the obstacle based on frequency difference between the transmitted radio wave and the reflected wave.

The front radar 120 may be connected to the first controller 140 via, for example, the NT or the hard wire or the PCB. The front radar 120 may transmit the front radar data to the first controller 140.

The plurality of corner radars 130 include a first corner radar 131 installed on a front right side of the vehicle 1, a second corner radar 132 installed on a front left side of the vehicle 1, a third corner radar 133 installed on a rear right side of the vehicle 1, and a fourth corner radar 134 installed on a rear left side of the vehicle 1.

The first corner radar 131 may have a field of sensing 131*a* facing the front right side of the vehicle 1. The first corner radar 131 may be installed on a right side of a front bumper of the vehicle 1.

The second corner radar 132 may have a field of sensing 132*a* facing the front left side of the vehicle 1, and may be installed on a left side of the front bumper of the vehicle 1.

The third corner radar 133 may have a field of sensing 133*a* facing the rear right of the vehicle 1, and may be installed on a right side of a rear bumper of the vehicle 1.

The fourth corner radar 134 may have a field of sensing 134*a* facing the rear left of the vehicle 1, and may be installed on a left side of the rear bumper of the vehicle 1.

Each of the first, second, third, and fourth corner radars 131, 132, 133 and 134 may include a transmission antenna and a reception antenna.

The first, second, third and fourth corner radars 131, 132, 133 and 134 may obtain first corner radar data, second corner radar data, third corner radar data, and fourth corner radar data, respectively.

The first corner radar data may include distance information and speed information regarding other vehicles, pedestrians or cyclists (hereinafter referred to as obstacles) located in the right front side of the vehicle 1.

The second corner radar data may include distance information and speed information of the obstacles located in the left front of the vehicle 1.

The third and fourth corner radar data may include distance information and speed information of the obstacles located in the right rear side of the vehicle 1 and the left rear side of the vehicle 1.

Each of the first, second, third, and fourth corner radars 131, 132, 133 and 134 may be connected to the first controller 140 via the NT, or the hard wire or the PCB. The first, second, third, and fourth corner radars 131, 132, 133 and 134 may transmit first, second, third, and fourth corner radar data to the first controller 140, respectively.

The first controller 140 may include is the ECU 101*b* (see FIG. 1) of the camera module 101 (see FIG. 1) and/or the ECU 102*b* (see FIG. 1) of the radar module 102 (see FIG. 1) and/or a separate integrated control device.

The first controller 140 includes a processor 141 and a memory 142.

The processor 141 may process the front image data of the front camera 110, the front radar data of the front radar 120, and the corner radar data of the plurality of corner radars 130, and generate a braking signal and a steering signal for controlling the braking system 32 and the steering system 42.

For example, the processor 141 may include an image signal processor that processes the front image data of the front camera 110 and/or a digital signal processor that processes the radar data of the radars 120 and 130 and/or a Micro Control Unit (MCU) that generates the braking signal and the steering signal.

The processor 141 may detect the obstacles (e.g., other vehicles, pedestrians, cyclists, curbs, guardrails, street trees, and street lights, etc.) in front of the vehicle 1 based on the front image data of the front camera 110 and the front radar data of the front radar 120.

In particular, the processor 141 may obtain location information (distance and direction) and speed information (relative speed) of the obstacles in front of the vehicle 1 based on the front radar data of the front radar 120. The processor 141 may obtain the location information (direction) and type information (e.g., whether the obstacle is a vehicle, a pedestrian, a cyclist, a curb, a guardrail, a street tree, or a street light, etc.) of the obstacles in front of the vehicle 1 based on the front image data of the front camera 110.

Furthermore, the processor 141 may match the obstacles detected by the front image data to the obstacles detected by the front radar data, and obtain the type information, the location information, and the speed information of the obstacles in the front of the vehicle 1 based on a result of matching.

The processor 141 may generate the braking signal and the steering signal based on the type information, the location information, and the speed information of the obstacle in front.

For example, the processor 141 may calculate a time to collision (TTC) between the vehicle 1 and the obstacle in front based on the location information (relative distance) and the speed information (relative speed) of the obstacle in front, and warn the driver of a collision, transmit the braking signal to the braking system 32, or transmit the steering signal to the steering system 42, based on the comparison result between the TTC and a predetermined reference time.

In response to that the TTC is less than a predetermined first reference time, the processor 141 may output a warning through audio and/or display.

In response to that the TTC is less than a predetermined second reference time, the processor 141 may transmit a pre-braking signal to the braking system 32.

In response to that the TTC is less than a predetermined third reference time, the processor 141 may transmit an emergency braking signal to the braking system 32. In this case, the second reference time is smaller than the first reference time, and the third reference time is smaller than the second reference time.

The processor 141 may transmit the steering signal to the steering system 42 based on direction information among the position information of the obstacle in front.

As another example, the processor 141 may calculate a distance to collision (DTC) based on the speed information (i.e., relative speed) of the obstacle ahead, and warn the driver of a collision or transmit the braking signal to the braking system 32 based on the comparison result between the DTC and a distance to the obstacle ahead.

The processor 141 may obtain the location information (distance and direction) and the speed information (relative speed) of the obstacle located on the side (front right, front left, rear right, rear left) of the vehicle 1 based on the corner radar data of the plurality of corner radars 130.

The memory 142 may store a program and/or data for the processor 141 to process image data, a program and/or data to process radar data, and programs and/or data for the processor 141 to generate a braking signal and/or a steering signal.

The memory 142 may include not only volatile memories such as a static random access memory (S-RAM) and a dynamic random-access memory (D-RAM), but also non-volatile memory such as a flash memory, a read-only memory (ROM), an erasable programmable read only memory (EPROM), and the like.

Figure 4:
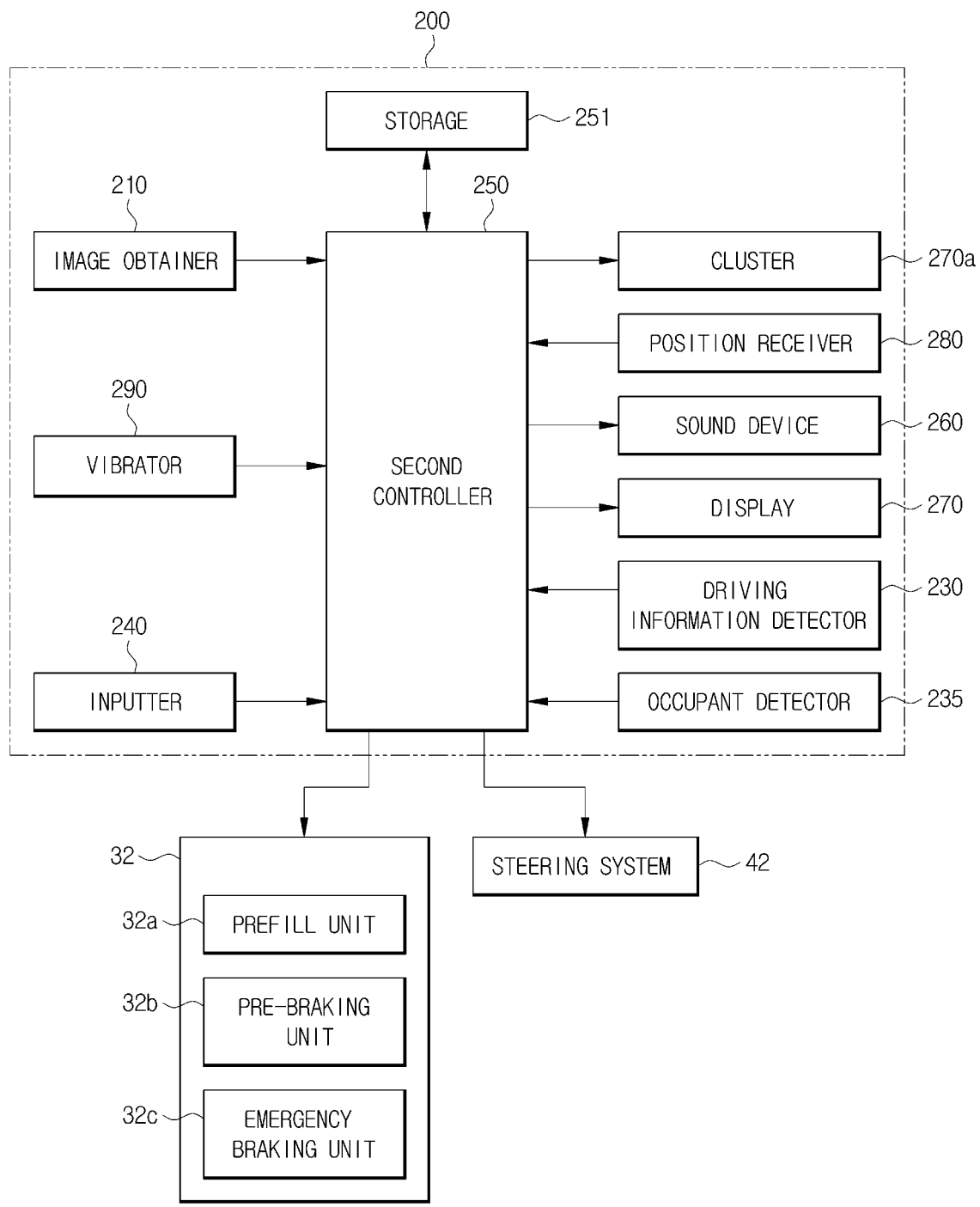
FIG. 4 is a view illustrating a configuration of a collision avoidance device of an advanced driver assistance system provided in a vehicle according to an embodiment of the disclosure.

FIG. 4 is a view illustrating a collision avoidance device 200 of the ADAS 100 provided in a vehicle according to an embodiment of the disclosure.

The collision avoidance device 200 of the ADAS 100 may include an image obtainer 210, an obstacle detector 220, a driving information detector 230, an occupant detector 235, an inputter 240, and a second controller 250, a storage 251, a sound device 260, a display 270, a position receiver 280, and a vibrator 290, and further include the braking system 32 and the steering system 42.

The image obtainer 210 obtains an image of a road, and transmits information on the obtained image to the second controller 250. Herein, image information may be image data.

The image obtainer 210 may include the front camera 110, and may obtain the image information of the road from the front image data captured by the front camera 110, and may obtain a shape of an obstacle.

Herein, the image information of the road may include an image of a lane and an image of other vehicles.

In addition, the shape of the obstacle may be information for recognizing the type of the obstacle. Furthermore, the position information and speed information of the obstacle may be obtained from the image data taken by the front camera.

The image obtainer 210 may be provided inside the vehicle to obtain an image of an occupant in the vehicle.

As such, the image obtainer 210 provided inside the vehicle may be used as the occupant detector 235.

The obstacle detector 220 detects the obstacle located on a front side and left and right sides of its own vehicle, and transmits obstacle information on the detected obstacle to the second controller 250. Herein, the obstacle information may include location information of the obstacle, and the location information of the obstacle may include distance information with the obstacle and direction information of the obstacle. The distance information on the distance with the obstacle may be distance information regarding a relative distance with the obstacle.

The obstacle detector 220 may include the front radar 120 and first and second corner radars 131 and 132.

Furthermore, the obstacle detector 220 may include a light detection and ranging (lidar) sensor. The lidar sensor is a non-contact distance detection sensor using the principle of laser radar. The lidar sensor may include a transmitter that transmits a laser, and a receiver that receives the laser reflected back from a surface of an object existing within a sensor range.

The obstacle detector 220 may include an ultrasonic sensor.

The ultrasonic sensor generates ultrasonic waves for a certain period of time and then detects a signal that is reflected back from an object. Such an ultrasonic sensor may be used to determine the presence or absence of an obstacle such as a pedestrian within a short range.

The driving information detector 230 detects driving information of the vehicle, such as driving speed information, driving direction information, and yaw rate information. Herein, the driving information of the vehicle may be information on the driving speed, driving direction, and driving distance of the vehicle.

The driving information detector 230 may include at least one of a speed detector, a steering angle detector, and a yaw rate detector.

The speed detector may include a plurality of wheel speed sensors and/or an acceleration sensor.

If the case of the speed detector is an acceleration sensor, the second controller 250 may obtain acceleration of its own vehicle based on information detected by the acceleration sensor and obtain the driving speed of its own vehicle based on the obtained acceleration.

If the speed detector is an acceleration sensor and a plurality of wheel speed sensors, the second controller 250 may obtain the acceleration of its own vehicle based on information detected by the acceleration sensor, and the driving speed of its own vehicle based on the speed information obtained by the plurality of wheel speed sensors.

The occupant detector 235 detects the presence of an occupant in the vehicle and transmits occupant information corresponding to the detected presence of the occupant to the second controller 250.

The occupant detector 235 may be a belt attachment/detachment detector that detects attachment/detachment of seat belts respectively provided on a plurality of seats inside the vehicle.

If the occupant detector 235 is a belt attachment/detachment detector, belt attachment/detachment information of the occupant detector 235 may be transmitted to the second controller 250 as information on whether or not an occupant is present.

The occupant detector 235 may include a weight detector respectively provided on a plurality of seats inside the vehicle and detecting a weight applied to each of the seats.

If the occupant detector 235 is the weight detector, the occupant detector 235 may transmit weight information on the weight of the occupant detected through the weight detector to the second controller 250, and at this time transmit the weight information together with identification information of the weight detector to the second controller 250. In this case, the second controller 250 may identify the number of weight detectors in which a weight greater than or equal to a reference weight is detected based on the weight information detected by each of weight detectors and a reference weight information, and obtain the number of occupants based on the identified number of weight detectors.

If the occupant detector 235 is a weight detector, the second controller 250 may obtain total weight information on a total weight of the occupants in the vehicle based on the weight information detected by the plurality of weight detectors.

If the occupant detector 235 is an internal image obtainer that obtains an image inside the vehicle, the second controller 250 may image-process the internal image of the vehicle obtained by the internal image obtainer, identify a person in the image-processed image, and obtain the number of occupants based on the number of identified persons.

The second controller 250 may obtain the total weight information of the occupant by estimating an age group of the persons based on the image information on the internal image, or obtain the total weight information of the occupant based on size information of the area occupied by the persons in the internal image. Herein, the age group may include infants, children, and adults.

The vehicle may further include a load detector that detects the weight of the load loaded in the vehicle and transmits weight information on the detected weight to the second controller 250. In this case, the load detector may be provided in a trunk of the vehicle. In this case, the second controller 250 may obtain the total weight information by summing the total weight of the occupant and the weight of the load.

The inputter 240 receives a user input.

The inputter 240 may also receive information on the number of occupants with respect to the number of occupants.

The inputter 240 may receive information on the number of occupants on the number of occupants excluding the driver, and may also receive information on the number of occupants on the number of occupants including the driver.

The inputter 240 may receive the weight information on the weight of each occupant in the vehicle.

The inputter 240 may also receive the weight information on the load for the weight of the load.

For example, the inputter 240 may receive the weight of the load as large, medium, or small, and may receive the weight of each occupant as large, medium, or small. In this case, the weight information for large, medium, and small may be stored in the storage.

The inputter 240 may receive the weight of the occupant and the weight of the load in a weight unit (e.g., kg).

The inputter 240 may receive an operation instruction for any one function among functions that may be performed in the vehicle. For example, the inputter 240 may receive the operation instruction of at least one of a radio function, an audio function, a video function, a map display function, a navigation function, a Digital Multimedia Broadcasting (DMB) function, a content playback function, and an Internet search function.

The inputter 240 receives any one of a manual driving mode in which the driver directly drives the vehicle and an autonomous driving mode in which the vehicle is driven automatically, and transmits the received signal to the second controller 250.

The inputter 240 may receive destination information while performing the autonomous driving mode or a navigation mode, and may receive route information for at least one of a plurality of routes.

The inputter 240 may receive a target driving speed in the autonomous driving mode.

The inputter 240 may receive an on/off instruction of a collision avoidance notification mode indicating the possibility of collision with an obstacle.

The inputter 240 may be provided in a head unit or a center fascia in the vehicle, or may be provided in a vehicle terminal. The inputter 240 may be provided as a button, a key, a switch, a lever, a jog dial, or the like, or may be provided as a touch pad.

The second controller 250 may control the vehicle to drive at a predetermined driving speed in the autonomous driving mode, or control the vehicle to drive at a driving speed input by a user.

In the autonomous driving mode, the second controller 250 may autonomously control driving to a destination, recognize the lanes and the obstacles of a road by performing image processing on the image information obtained by the image obtainer 210, recognize the own lane on which its own vehicle travels based on the recognized lane position information, obtain a distance to the recognized obstacles based on the obstacle information detected by the obstacle detector 220, and control lane change, acceleration and deceleration based on the obtained distance with the obstacles.

In the autonomous driving mode, the second controller 250 may also perform avoidance control for avoiding the obstacles by creating a detour route based on the obstacle information of the obstacles. In this case, the second controller 250 may control at least one of the braking system 32 and the steering system 42 for avoidance control.

In response to determining that the collision avoidance notification mode is selected while the manual driving mode is being performed, the second controller 250 determines whether to collide with the obstacle by using the image information obtained by the image obtainer 210 and the obstacle information obtained by the obstacle detector 220, and controls output of collision risk information based on whether to collide with the obstacle and performs collision avoidance or avoidance control. The second controller 250 may control the braking system 32 to avoid a collision while performing the manual driving mode.

When controlling the braking system 32 in order to avoid a collision, the second controller 250 controls operation of any one of a prefill unit 32a, a pre-braking unit 32b, and an emergency braking unit 32c based on time information until the collision with the obstacle or relative distance information with the obstacle.

The second controller 250 may control operation of the braking system to achieve a predetermined deceleration during braking.

The second controller 250 may control the pre-braking unit to achieve a first deceleration when controlling the pre-braking unit of the braking system, and may control the emergency braking unit to achieve a second deceleration when controlling the emergency braking unit of the braking system. Herein, the first and second decelerations may be predetermined decelerations.

The second controller 250 may change a warning time for outputting the collision risk information based on the occupant information received from the occupant detector 235.

Herein, the occupant information may include information on the number of occupants or the total weight of occupants.

For example, as the number of occupants increases, the second controller 250 may shorten the warning time for outputting the collision risk information more than a reference warning time.

As another example, as the weight of the occupant increases, the second controller 250 may shorten the warning time for outputting the collision risk information more than a reference warning time.

The second controller 250 may change a first stage warning time, a second stage warning time, and a third stage warning time based on the number of occupants.

The first stage warning is to output a collision risk sound, and the second stage warning is to output the collision risk sound, display a collision risk image, and generate a belt vibration. In addition, the third stage warning is to output the collision risk sound, display the collision risk image, and generate the belt vibration, but outputs a sound of a higher level than the sound at the second stage warning and generates a stronger level of vibration.

The second controller 250 may change the warning time of the first stage in response to the change in a control time of the prefill unit, change the warning time of the second stage in response to the change in a control time of the pre-braking unit, and change the warning time of the third stage in response to the change in a control time of the emergency braking unit.

If the occupant detector 235 is a belt attachment/detachment detector, the second controller 250 may obtain the occupant information on the number of occupants based on the attachment/detachment signals received from the plurality of belt attachment/detachment detectors.

If the occupant detector 235 is a weight detector, the second controller 250 may identify a seat in which a weight greater than or equal to the reference weight is detected based on the weight information received from the occupant detector 235 and the reference weight information, and obtain the occupant information on the number of occupants based on the number of the identified seats.

If the occupant detector 235 is a weight detector, the second controller 250 may obtain the total weight information based on the weight information received from the occupant detector 235, adjust any one of first to third braking distances based on the obtained total weight information, and change the warning time for outputting the collision risk information based on the obtained total weight.

Herein, the total weight information may be the total weight information of the occupants, or may be the total weight information obtained by summing the weights of the occupants and the loads.

The second controller 250 may also obtain information on the number of occupants, the total weight of the occupants, and the weight of the loads in response to the user input by the inputter 240.

The second controller 250, based on the image obtained by the image obtainer provided inside the vehicle among the image obtainers 240, may obtain the information on the number of occupants and obtain the information on the total weight of the occupants.

The second controller 250 may control any one of the control time of the prefill unit, the control time of the pre-braking unit, and the control time of the emergency braking unit, based on the occupant information.

The second controller 250, based on the occupant information received from the occupant detector 235, may adjust the first braking distance for controlling the prefill unit 32a, the second braking distance for controlling the pre-braking unit 32b, and the third braking distance for controlling the emergency braking unit 32c.

Herein, the first, second, and third braking distances may be predetermined braking distances.

The second controller 250 may increase the first braking distance based on the occupant information, increase the second braking distance based on the occupant information, or increase the third braking distance based on the occupant information.

For example, the higher the number of occupants increases, the more the second controller 250 may further increase the first braking distance for controlling the prefill unit 32a, further increase the second braking distance for controlling the pre-braking unit 32b, or further increase the third braking distance for controlling the emergency braking unit 32c.

The second controller 250 may change the warning time of the first, second and third stages for outputting the collision risk information in response to the increase in the first, second and third braking distances. For example, when the first braking distance for controlling the prefill unit increases, the second controller 250 may shorten the warning time of the first stage for outputting the collision risk information.

The second controller 250 obtains relative distance information with the obstacles based on the image obtained by the image obtainer 210 and the obstacle information detected by the obstacle detector, and selectively controls the prefill unit 32a, the pre-braking unit 32b, and the emergency braking unit 32c of the braking system 32 based on the relative distance information with the obtained obstacles and the predetermined braking distance information, and in particular controls the pre-braking unit 32b and the emergency braking unit 32c to achieve the predetermined deceleration.

The predetermined deceleration information includes the first deceleration and the second deceleration.

In other words, the second controller 250 may control operation of the pre-braking unit 32b so that the deceleration of the vehicle becomes the first deceleration when controlling the pre-braking unit 32b, and control operation of the emergency braking unit 32c so that the deceleration of the vehicle becomes the second deceleration when controlling the emergency braking unit 32*c*.

The second controller 250 may recognize a face image of a driver in the image obtained by the image obtainer provided inside the vehicle among the image obtainer 240, determine whether the driver does not keep looking forward while driving based on image information on the recognized face image, and control the operation of any one of the prefill unit 32*a*, the pre-braking unit 32*b*, and the emergency braking unit 32*c* based on the deceleration information in response to determining that the driver does not keep looking forward while driving, and the second controller 250 may adjust the predetermined braking distance based on the number of occupants or change the warning time for outputting the collision risk information.

The second controller 250 may control operation of the sound device 260 when controlling the prefill unit 32*a*.

The second controller 250 may control the operation of the sound device 260 and the display 270 when controlling the pre-braking unit 32*b*, and may control operation of the vibrator 290.

Herein, the display 270 may include a cluster 270*a*.

The second controller 250 may control the operation of the sound device 260, the display 270, and the vibrator 290 when controlling the emergency braking unit 32*c*.

A volume of sound output through the sound device while controlling the emergency braking unit may be greater than that of sound output through the sound device while controlling the pre-braking unit.

An intensity of vibration generated through the vibrator while controlling the emergency braking unit may be greater than that of vibration generated through the vibrator while controlling the pre-braking unit.

The second controller 250 may control at least one of the display 270 and the sound device 260 to output warning information informing of caution of collision with an obstacle, and may control the vibrator 290.

In response to that the number of occupants is one (i.e., only the driver exists), the second controller 250 determines whether the relative distance with the obstacle is the first braking distance, and controls the prefill unit based on vehicle attitude information of the controller for controlling attitude stability of the vehicle in response to determining that the relative distance with the obstacle is the first braking distance.

In response to that the relative distance with the obstacle is the first braking distance, the second controller 250 determines that it is the warning time of the first stage, and controls the operation of the sound device to output the collision risk information corresponding to the warning of the first stage.

In response to that the number of occupants is one (i.e., only the driver exists, the number of occupants is predetermined), the second controller 250 determines whether the relative distance with the obstacle is the second braking distance, and in response to determining that the relative distance with the obstacle is the second braking distance controls the operation of the pre-braking unit and controls the operation of the sound device, the display, and the vibrator to output the collision risk information corresponding to the warning of the second stage.

In response to that the number of occupants is one (i.e., only the driver exists), the second controller 250 determines whether the relative distance with the obstacle is the third braking distance, and in response to determining that the relative distance with the obstacle is the third braking distance controls the operation of the emergency braking unit and controls the operation of the sound device, the display, and the vibrator to output the collision risk information corresponding to the warning of the third stage.

Figure 5:
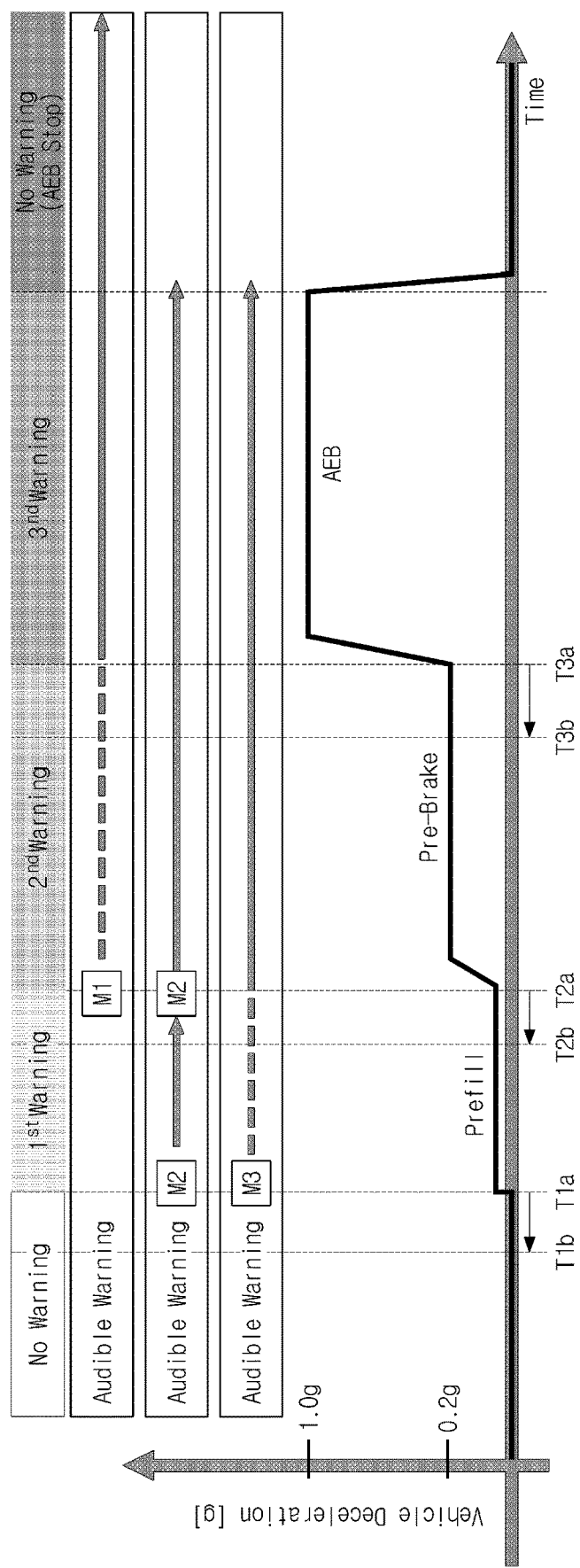
FIG. 5 is a view illustrating a warning time and a braking control time of a collision avoidance device of an advanced driver assistance system provided in a vehicle according to an embodiment of the disclosure.

Referring to FIG. 5, the second controller 250 may control the prefill unit at a first timing T1*a* at which the relative distance with the obstacle is the first braking distance and control output of the first stage warning M1, control the pre-braking unit at a second timing T2*a* at which the relative distance with the obstacle is the second braking distance and control operation of the second stage warning M1, M2, and M3, and control the emergency braking unit at a third timing T3*a* at which the relative distance with the obstacle is the third braking distance and control output of the third stage warning M1, M2, and M3.

In response to determining that the number of occupants exceeds one, the second controller 250 identifies an increasing distance of the first braking distance corresponding to the number of occupants, and in response to that the relative distance with the obstacle is the identified increasing distance controls the prefill unit based on vehicle attitude control information of a controller (not shown) for Electronic Speed Controls (ECS) and controls the operation of the sound device to output the collision risk information corresponding to the first stage warning.

In response to determining that the number of occupants exceeds one, the second controller 250 identifies an increasing distance of the second braking distance corresponding to the number of occupants, and in response to that the relative distance with the obstacle is the identified increasing distance controls the pre-braking unit and controls the operation of the sound device, the display, and the vibrator to output the collision risk information corresponding to the second stage warning.

In response to determining that the number of occupants exceeds one, the second controller 250 identifies an increasing distance of the third braking distance corresponding to the number of occupants, and in response to that the relative distance with the obstacle is the identified increasing distance controls the emergency braking unit and controls the operation of the sound device, the display, and the vibrator to output the collision risk information corresponding to the third stage warning.

Referring to FIG. 5, the second controller 250 may control the prefill unit at a first shortened time T1*b* at which the relative distance with the obstacle reaches the increased distance of the first braking distance and control the output of the first stage warning M1, control the pre-braking unit at a second shortened time T2*b* at which the relative distance with the obstacle reaches the increasing distance of the second braking distance and control the output of the second stage warning M1, M2, and M3, and control the emergency braking unit at a third shortened time T3*b* at which the relative distance with the obstacle reaches the increased distance of the third braking distance and control the output of the third stage warning M1, M2, and M3.

The shortening of the warning time refers to that a warning time for outputting the collision risk information becomes faster as the braking distance increases.

The earlier the warning time is refers to that the time at which the collision risk information is output at a braking distance changed according to the number of occupants becomes faster than a time at which the collision risk information is output at the predetermined braking distance.

In response to determining that collision prevention by braking is unavoidable, the second controller 250 may obtain the direction of the obstacle and control the steering system.

The second controller 250 may adjust the third braking distance based on information on a minimum avoidance distance for avoiding collision with the obstacle by braking.

The second controller 250 may control the braking based on the information on the minimum avoidance distance for avoiding collision with the obstacle by braking and the driving speed information.

In response to that the driving speed of the vehicle is less than or equal to a reference speed, the second controller 250 may perform an avoidance control for avoiding collision with the obstacle by braking.

The second controller 250 may control the steering based on information on the minimum avoidance distance for avoiding collision with the obstacle by steering.

In response to that the driving speed of the vehicle is less than or equal to the reference speed, the second controller 250 may perform an avoidance control for avoiding collision with the obstacle by steering.

The second controller 250 may control the braking and steering based on the information on the minimum avoidance distance for avoiding collision with the obstacle by braking and steering.

The braking system 32 may generate a braking force in response to a braking signal from the second controller 250.

The braking system 32 may include the prefill unit 32*a*, the pre-braking unit 32*b*, and the emergency braking unit 32*c*.

The prefill unit 32*a* may enter a braking preparation state in response to a control instruction from the second controller 250.

The pre-braking unit 32*b* performs an automatic braking at a predetermined first deceleration in response to a control instruction from the second controller 250.

The pre-braking unit 32*b* performs a partial braking to complete a preliminary preparation for emergency braking.

The emergency braking unit 32*c* performs automatic braking to have a predetermined second deceleration in response to the control instruction from the second controller 250.

Herein, the predetermined second deceleration may be a deceleration corresponding to a maximum braking pressure generated when a collision with an obstacle cannot be avoided.

The emergency braking unit 32*c* may perform the automatic braking at a deceleration corresponding to the maximum braking pressure even when a brake pedal is pressed.

The steering system 42 may perform the steering to adjust a driving route in response to the steering signal of the second controller 250.

The storage 251 may also store information on a braking distance for each weight.

The storage 251 may also store information on a braking distance for each number of occupants.

More specifically, the storage 251 may store information on the first braking distance of the prefill unit, the second braking distance of the pre-braking unit, and the third braking distance of the emergency braking unit.

The first, second, and third braking distances may be braking distances corresponding to the number of occupants which is one.

The first, second, and third braking distances may be braking distances corresponding to the reference weight.

The storage 251 may store sound volume information and vibration intensity information corresponding to the warning of the second stage.

The storage 251 may store information on the increasing distance of the first braking distance of the prefill unit, the increasing distance of the second braking distance of the pre-braking unit, and the increasing distance of the third braking distance of the emergency braking unit based on the number of occupants, in a first table.

The storage 251 may store information on the increasing distance of the first braking distance of the prefill unit, the increasing distance of the second braking distance of the pre-braking unit, and the increasing distance of the third braking distance of the emergency braking unit based on a weight, in a second table.

For example, the storage 251 may store a first increasing distance for the first braking distance of the prefill unit when there are two occupants, a second increasing distance for the first braking distance of the prefill unit when there are three occupants, a third increasing distance for the first braking distance of the prefill unit when there are four occupants, and a fourth increasing distance for the first braking distance of the prefill unit when there are five occupants. In this case, the first, second, third, and fourth increasing distances may be the same or different.

The storage 251 may store a fifth increasing distance for the second braking distance of the pre-braking unit when there are two occupants, a sixth increasing distance for the second braking distance of the pre-braking unit when there are three occupants, a seventh increasing distance for the second braking distance of the pre-braking unit when there are four occupants, and an eighth increasing distance for the second braking distance of the pre-braking unit when there are five occupants.

The fifth, sixth, seventh, and eighth increment distances may be equal to or different from each other.

Furthermore, the first, second, third, and fourth increasing distances may be the same as or different from the fifth, sixth, seventh, and eighth increasing distances.

The storage 251 may store a ninth increasing distance for the third braking distance of the emergency braking unit when there are two occupants, a tenth increasing distance for the third braking distance of the emergency braking unit when there are three occupants, an eleventh increasing distance for the third braking distance of the emergency braking unit when there are four occupants, and a twelfth increasing distance for the third braking distance of the emergency braking unit when there are five occupants.

The ninth, tenth, eleventh, and twelfth increasing distances may be the same as or different from each other.

The ninth, tenth, eleventh, twelfth increasing distances may be the same as or different from the first, second, third, and fourth increasing distances and the fifth, sixth, seventh, and eighth increasing distances.

The storage 251 may store the reference weight information.

The storage 251 may store identification information of a belt provided on each seat, and may also store identification information of a weight detector provided on each seat.

Figure 6:
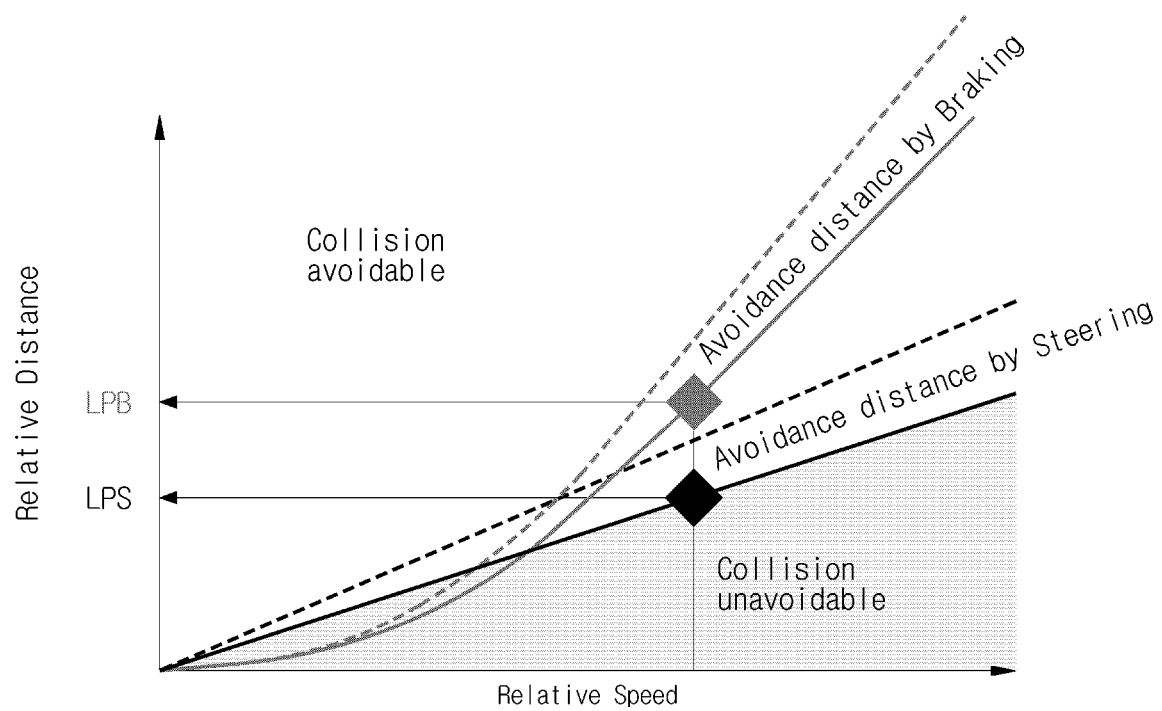
FIG. 6 is a graph in which a minimum avoidance distance by steering and braking in response to a relative speed and a relative distance between a vehicle and an obstacle is matched, respectively, according to an embodiment of the disclosure.

Referring to FIG. 6, the storage 251 may store a table in which the minimum avoidance distance by steering and braking corresponding to the relative distance and the relative speed are matched, respectively (also referred to as last point to brake (LPB) and last point to steer (LPS)). The minimum avoidance distance table may be provided for each number of occupants.

The storage 251 may be implemented as at least one of a nonvolatile memory device such as a cache, read only memory (ROM), programmable ROM (PROM), erasable programmable ROM (EPROM), electrically erasable programmable ROM (EEPROM), and flash memory, or a volatile memory device such as random access memory (RAM), or a storage medium such as hard disk drive (HDD) and a CD-ROM, but is not limited thereto.

The storage 251 may be a memory implemented as a chip separate from the processor described above relating to the second controller 250, or may be implemented as a single chip with the processor.

The sound device 260 outputs sound in response to the control instruction of the second controller 250, and outputs the sound at a level corresponding to the control instruction of the second controller 250.

The sound device 260 may output warning information as a sound so as to notify danger of a collision with an obstacle. The sound device 260 may be a speaker.

The display 270 displays operation information for a function being performed.

For example, the display 270 may display information in association with a phone call, display information of a content output through the terminal, or display information in association with music playback, and may display information related to external broadcast information.

The display 270 may display map information, and also display map information and route guidance information in which a route to a destination is matched.

When there are a plurality of routes to the destination, the display 270 may display a driving time and a driving distance corresponding to each route so that user may easily select the route.

The display 270 may display the autonomous driving mode or the manual driving mode, and may display on/off information of the collision avoidance notification mode.

The display 270 may display an image of a road or display location information of a pedestrian.

The display 270 may display the collision risk information indicating the collision with the obstacle as an image.

The display 270 may display deceleration information and steering information for obstacle avoidance as an image.

The display 270 may display an image or turn on/off in response to the control instruction of the second controller 250.

The display 270 may change a background color in response to the control instruction of the second controller 250.

The display 270 may be a lamp such as a light emitting diode (LED) or a flat panel display device such as a liquid crystal display (LCD).

The display 270 may be a display panel to be provided in a vehicle terminal.

The display 270 may include the cluster 270a provided in the vehicle.

The display 270 may display rotatable and non-rotatable information as text or emoticons. The display 270 may display the rotatable image and the non-rotatable image in different colors.

The location receiver 280 may receive location information of the own vehicle and transmit the received location information to the controller 140.

The location receiver 280 may include a Global Positioning System (GPS) receiver that communicates with a plurality of satellites to calculate the location of the own vehicle.

The vibrator 290 may be provided on a seat or a belt, and generate vibration in response to the control instruction of the second controller 250, but generate vibration at a level corresponding to the control instruction of the second controller 250.

Figure 7:
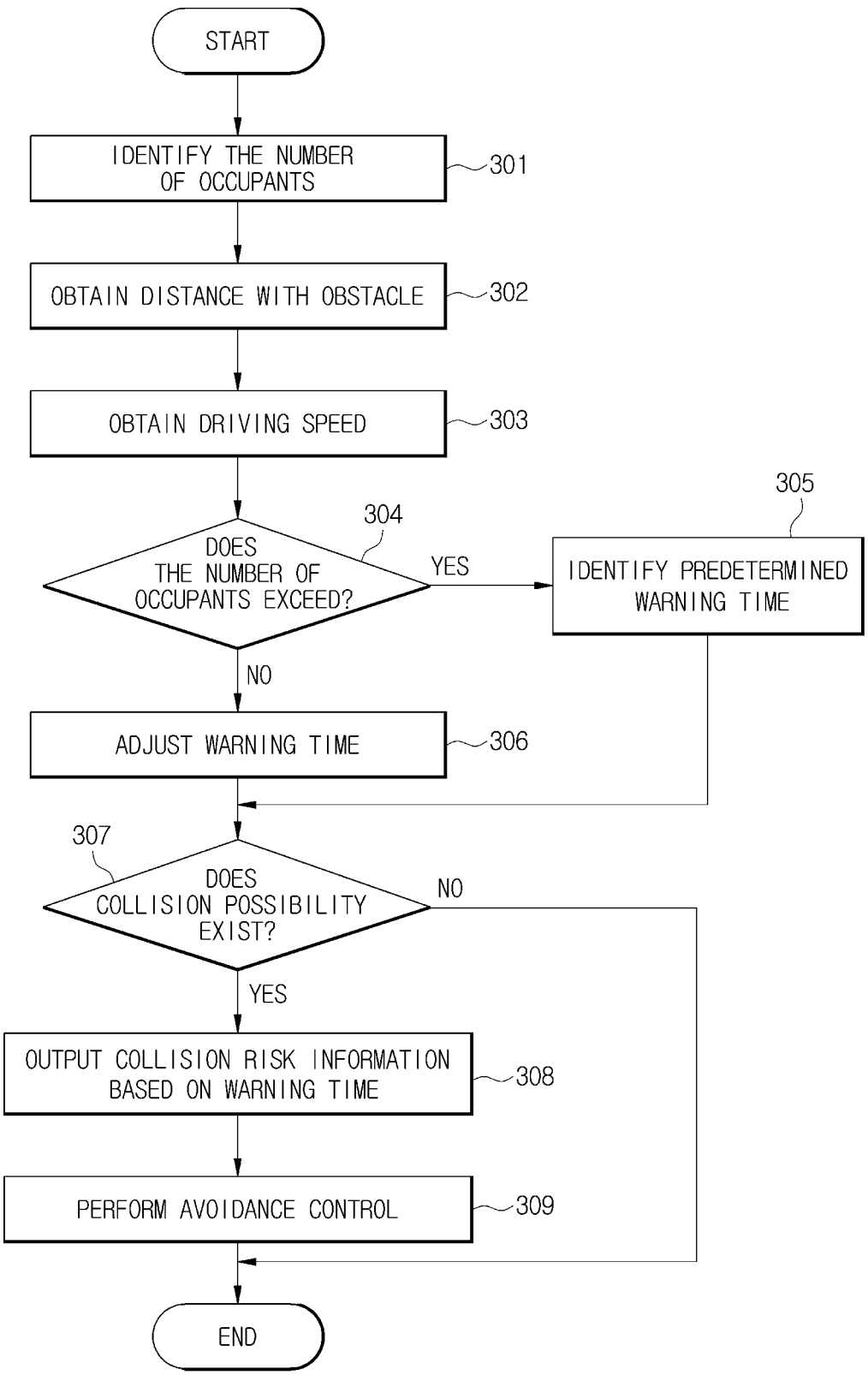
FIG. 7 is a control flowchart of a vehicle according to an embodiment of the disclosure.

FIG. 7 is a control flowchart illustrating a collision avoidance device provided in a vehicle according to an embodiment of the disclosure.

In response to starting a vehicle, the vehicle identifies the number of occupants (in operation 301).

Determining the number of occupants includes identifying the weight applied to a seat of the vehicle.

In other words, the vehicle counts the weight detector that detects a weight greater than or equal to or the reference weight based on the weight information detected by the weight detector provided in each seat, and identifies the number of the counted weight detectors to determine the number of occupants.

Furthermore, the vehicle identifies whether the belts of each seat are attached or detached based on the information on the attachment/detachment of the belts of each seat, identifies the number of belts connected to each other among the belts of each seat based on the identified attachment/detachment, and determine the number of occupants based on the number of the identified belts.

Determining the number of occupants may include recognizing the occupants inside the vehicle from the image obtained by the internal image obtainer, and identifying the number of recognized occupants.

The vehicle obtains the relative distance with the obstacle based on the obstacle information detected by the obstacle detector while driving (in operation 302), and obtains the driving speed of the vehicle based on the speed information detected by the speed detector (in operation 303).

The vehicle determines whether the number of occupants exceeds one (in operation 304), and sets the warning time as a predetermined warning time in response to determining that the number of occupants is one (in operation 305) and adjusts the warning time in response to determining that the number of occupants exceeds one (in operation 306).

Herein, one occupant may be the driver.

Setting the warning time as the predetermined warning time is to output the first stage warning when the relative distance with the obstacle reaches the first braking distance.

Setting the warning time as the predetermined warning time is to output the second stage warning when the relative distance with the obstacle reaches the second braking distance.

Setting the warning time as the predetermined warning time is to output the third stage warning when the relative distance with the obstacle reaches the third braking distance.

Adjusting the warning time includes increasing the first, second, and third braking distances in response to the number of occupants such that a time at which the first, second, and third stage warnings are output becomes earlier.

The vehicle determines whether a possibility of collision with the obstacle exists based on the relative distance with the obstacle and the driving speed (in operation 307).

In response to determining that the collision possibility exists, the vehicle outputs the collision risk information based on the set warning time (in operation 308) and performs avoidance control (in operation 309).

Outputting the collision risk information and performing the avoidance control based on the set warning time includes outputting the collision risk information and avoiding the collision risk information based on the predetermined first, second, and third braking distances or the adjusted first, second, and third braking distances.

Herein, the first braking distance may be a distance longer than the second braking distance, and the second braking distance may be a distance longer than the third braking distance.

This will be described in more detail.

In response to that the number of occupants is one (i.e., only the driver exists), the vehicle sets the braking distance for controlling the braking system to the predetermined braking distance.

In response to that the number of occupants is one (i.e., only the driver exist), the vehicle determines whether the relative distance with the obstacle is the first braking distance, and in response to determining that the relative distance with the obstacle is the first braking distance controls the prefill unit based on the vehicle attitude information of the controller (not shown) for controlling the attitude stability of the vehicle and controls the operation of the sound device to output the collision risk information corresponding to the warning of the first stage.

The prefill control is to prepare the braking by driving the motor to increase a brake oil pressure.

Furthermore, the vehicle determines whether the relative distance with the obstacle is the second braking distance, and in response to determining that the relative distance with the obstacle is the second braking distance controls the operation of the pre-braking unit and controls the operation of the sound device, the display, and the vibrator to output the collision risk information corresponding to the warning of the second stage.

The pre-braking control is to perform the partial braking to perform preliminary preparation for the emergency braking.

The pre-braking control includes limiting unnecessary power by reducing engine torque.

Furthermore, the vehicle determines whether the relative distance with the obstacle is the third braking distance, and in response to determining that the relative distance to the obstacle is the third braking distance controls the operation of the emergency braking unit and controls the operation of the sound device, the display, and the vibrator to output the collision risk information corresponding to the warning of the third stage.

In other words, the vehicle may control the prefill unit at the first timing T1a where the relative distance with the obstacle is the first braking distance, and control the output of the first stage warning. The vehicle may also control the pre-braking unit at the second timing T2a where the relative distance with the obstacle is the second braking distance, and control the output of the second stage warning. The vehicle may also control the emergency braking unit at the third timing T3a where the relative distance with the obstacle is the third braking distance, and control the output of the third stage warning.

In response to determining that the number of occupants exceeds one, the vehicle identifies the increasing distance of the first braking distance, the increasing distance of the second braking distance, and the increasing distance of the third braking distance, which are corresponding to the number of occupants.

In response to that the relative distance with the obstacle is the identified increasing distance of the first braking distance, the vehicle controls the prefill unit based on the vehicle attitude control information of a controller for ECS and controls the operation of the sound device to output the collision risk information corresponding to the first stage warning.

Furthermore, in response to that the relative distance with the obstacle is the identified increasing distance of the second braking distance, the vehicle controls the pre-braking unit and controls the operation of the sound device, the display, and the vibrator to output the collision risk information corresponding to the second stage warning.

In response to that the relative distance with the obstacle is the identified increasing distance of the third braking distance, the vehicle controls the emergency braking unit and controls the operation of the sound device, the display, and the vibrator to output the collision risk information corresponding to the third stage warning.

The vehicle may control the prefill unit at the first shortened time when the relative distance with the obstacle reaches the increased distance of the first braking distance, and control the output of the first stage warning. The vehicle may also control the pre-braking unit at the second shortened time when the relative distance with the obstacle reaches the increasing distance of the second braking distance, and control the output of the second stage warning. The vehicle may also control the emergency braking unit at the third shortened time when the relative distance with the obstacle reaches the increased distance of the third braking distance, and control the output of the third stage warning.

As described above, the vehicle may perform automatic braking if there is no driver's braking operation corresponding to the pressing of the brake pedal even in the process of the second stage warning that performs belt vibration and displays warning on the display.

The vehicle may perform a control in which the seat belt is tightened by a certain amount in order to assist the driver in restraining the seat while performing the emergency braking.

As such, the vehicle analyzes the possibility of collision with the obstacle, and in response to determining that a collision risk situation occurs, first implements the first stage warning to inform the driver as an audible warning.

Nevertheless, if there is no action taken by the driver and the collision risk is higher than that of the first stage warning, the vehicle raises the warning stage to limit power by lowering the engine torque along with the partial braking and prepares for the emergency braking.

If the collision risk continues to rise higher than the second stage, the vehicle performs automatic emergency braking. At this time, full braking of about −0.7∼−1.0 g is performed radically.

As a result, when the vehicle is stopped, the hydraulic pressure is released after a process of maintaining braking force for a while.

The vehicle may obtain the direction information of the obstacle based on the obstacle information detected by the obstacle detector 220 and control the steering based on the obtained direction information of the obstacle.

As is apparent from the above, an embodiment of the disclosure may avoid a collision with an obstacle by changing the warning time for outputting the collision risk information with the obstacle based on the number of occupants or the amount of loads.

In other words, the embodiment of the disclosure may improve precision of the ADAS for collision avoidance by changing the warning time at which the collision risk information indicating the collision with the obstacle is output based on a difference in a braking distance that varies depending on the number of occupants in the vehicle. Accordingly, the disclosure may improve the safety of the vehicle and reduce the risk of a traffic accident.

Furthermore, the embodiment of the disclosure may improve precision of avoidance control by adjusting the avoidance time for avoiding the collision with the obstacle based on the occupant information, the distance information with an obstacle, and the driving speed information.

Furthermore, the embodiment of the disclosure may change the warning time for outputting the collision risk information with respect to the risk of collision with the obstacle in a state in which no hardware component is added and perform the avoidance control, thereby improving the stability of the vehicle while preventing the cost increase of the vehicle.

As described above, the embodiment of the disclosure may improve quality and marketability of the ADAS and the vehicle having the ADAS, so that user satisfaction may be increased and product competitiveness may be secured.

On the other hand, embodiments of the disclosure may be implemented in the form of a recording medium storing instructions executable by a computer. Instructions may be stored in the form of program code, and when executed by a processor, may generate program modules to perform operations of the disclosed embodiments. The recording medium may be implemented as a computer-readable recording medium.

The computer-readable recording medium includes all kinds of recording media in which instructions which can be decoded by a computer are stored, for example, a read only memory (ROM), a random access memory (RAM), a magnetic tape, a magnetic disk, a flash memory, an optical data storage device, and the like.

Embodiments of the disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A vehicle, comprising:
   a display;
   a sound device;
   a vibrator;
   an occupant detector configured to detect an occupant to output occupant information including at least one of the number of occupants and a total weight of occupants;
   an obstacle detector configured to detect an obstacle to output obstacle information;
   a braking system that generates a braking force; and
   a controller configured to:
   set braking distance information based on the at least one of the number of occupants and the total weight of occupants, control operation of at least one of the display, the sound device, and the vibrator based on the set braking distance information and the obstacle information, and control the braking system in response to operation control information of the at least one of the display, the sound device and the vibrator.

2. The vehicle of claim 1, wherein the braking system is configured to perform a prefill, a pre-braking, and an emergency braking.

3. The vehicle of claim 2, wherein the controller is configured to:
   control the operation of the sound device when performing control for the prefill, and
   control the operation of the sound device, the display, and the vibrator when performing control for the pre-braking and the emergency braking,
   wherein a volume of sound output from the sound device while controlling the emergency braking is greater than that of sound output from the sound device while controlling the pre-braking; and
   an intensity of vibration generated by the vibrator while controlling the emergency braking is greater than that of vibration generated by the vibrator while controlling the pre-braking.

4. The vehicle of claim 1, further comprising a storage for storing a braking distance corresponding to the number of occupants,
   wherein when setting the braking distance based on the at least one of the number of occupants and the total weight of occupants,
   the controller is configured to:
   set the braking distance to a predetermined braking distance in response to determining that the number of occupants is a predetermined number based on the occupant information,
   set the braking distance corresponding to the number of occupants based on information stored in the storage in response to determining that the number of occupants exceeds the predetermined number, and
   the set braking distance is longer than the predetermined braking distance.

5. The vehicle of claim 4, wherein the predetermined braking distance comprises a first braking distance for controlling the prefill, a second braking distance for controlling the pre-braking, and a third braking distance for controlling the emergency braking.

6. The vehicle of claim 5, wherein the controller is configured to:
   obtain relative distance information with the obstacle based on the obstacle information, and control the prefill, the pre-braking, and the emergency braking based on the obtained relative distance information with the obstacle and the first, second and third braking distances.

7. The vehicle of claim 6, wherein the controller is configured to:
   determine a warning time of a first stage in response to a control time of the prefill, determine a warning time of a second stage in response to a control time of the pre-braking, and determine a warning time of a third stage in response to a control time of the emergency braking.

8. The vehicle of claim 1, wherein the occupant detector is provided on a plurality of seat belts, respectively, and detects attachment/detachment of each belt to output attachment/detachment information.

9. The vehicle of claim 1, wherein the occupant detector is provided on a plurality of seats, respectively, and detects a weight applied to each seat to output weight information detected.

10. A vehicle, comprising:
    an occupant detector configured to detect an occupant to output occupant information;
    an obstacle detector configured to detect an obstacle to output obstacle information;
    a braking system that performs a prefill, a pre-braking and an emergency braking;
    a storage configured to store information on a first braking distance for controlling the prefill, a second braking distance for controlling the pre-braking, and a third braking distance for controlling the emergency braking, and store information on an increasing distance of the first braking distance, an increasing distance of the second braking distance, and an increasing distance of the third braking distance, per the number of occupants; and a controller configured to:

control the braking system based on the information on the first, second and third braking distances and the obstacle information in response to determining that the number of occupants is a predetermined number based on the occupant information, and identify the information on the increasing distances of the first, second and third braking distances corresponding to the number of occupants in response to determining that the number of occupants exceeds the predetermined number and control the braking system based on the information on the increasing distances of the first, second and third braking distances and the obstacle information.

11. The vehicle of claim 10, wherein the controller is configured to:

determine a warning time of a first stage in response to a control time of the prefill, determine a warning time of a second stage in response to a control time of the pre-braking, and determine a warning time of a third stage in response to a control time of the emergency braking.

12. The vehicle of claim 11, further comprising a display, a sound device, and a vibrator, wherein the controller is configured to control operation of the sound device in response to determining that it is the warning time of the first stage, and control operation of the sound device, the display, and the vibrator in response to determining that it is the warning time of the second and third stages.

13. The vehicle of claim 12, wherein a volume of sound output from the sound device when controlling the emergency braking, by the controller, is greater than that of sound output from the sound device when controlling the pre-braking, and an intensity of vibration generated by the vibrator when controlling the emergency braking, by the controller, is greater than that of vibration generated by the vibrator when controlling the pre-braking.

14. An advanced driver assistance system, comprising:

a camera for obtaining an image of a road and an image of an occupant; and a controller including a processor for processing the image of the road obtained by the camera, wherein the controller is configured to:

obtain occupant information from the image obtained by the camera, control a prefill, a pre-braking, and an emergency braking based on predetermined first, second, and third braking distance information in response to determining that the number of occupants is a predetermined number based on the obtained occupant information, and control the prefill, the pre-braking and the emergency braking based on information on an increasing distance of the first, second, and third braking distances corresponding to the number of occupants in response to determining that the number of occupants exceeds the predetermined number.

15. The advanced driver assistance system of claim 14, wherein the controller is configured to:

determine a warning time of a first stage in response to a control time of the prefill, determine a warning time of a second stage in response to a control time of the pre-braking, and determine a warning time of a third stage in response to a control time of the emergency braking.

16. The advanced driver assistance system of claim 14, further comprising a display, a sound device, and a vibrator, wherein the controller is configured to control operation of the sound device in response to determining of the warning time of the first stage, and control the operation of the sound device, the display, and the vibrator in response to determining that the warning time of the second and third stages.

17. The advanced driver assistance system of claim 14, further comprising an obstacle detector configured to detect an obstacle to output obstacle information;

wherein the controller is configured to identify the obstacle information from the image of the road, determine a collision possibility based on the obstacle information detected by the obstacle detector and the identified obstacle information, and control the prefill, the pre-braking, and the emergency braking in response to determining that the collision possibility exists.

18. The advanced driver assistance system of claim 17, wherein the controller is configured to determine whether a driver keeps looking forward while driving based on the image obtained by the camera, and in response to determining that the driver does not keep looking forward while driving, detect the obstacle information through the obstacle detector in order to control the prefill, the pre-braking and the emergency braking.

* * * * *